United States Patent [19]

Weber

[11] Patent Number: 4,584,857
[45] Date of Patent: Apr. 29, 1986

[54] DEVICE FOR BLOCKING THE ROTARY MOVEMENT OF A STEERING COLUMN

[75] Inventor: Günter Weber, Wuppertal, Fed. Rep. of Germany

[73] Assignee: Neiman S.A., Courbevoie, France

[21] Appl. No.: 555,879

[22] PCT Filed: Feb. 18, 1983

[86] PCT No.: PCT/EP83/00039
§ 371 Date: Nov. 9, 1983
§ 102(e) Date: Nov. 9, 1983

[87] PCT Pub. No.: WO83/03082
PCT Pub. Date: Sep. 15, 1983

[51] Int. Cl.[4] ............................................. B60R 25/02
[52] U.S. Cl. ........................................... 70/184; 70/252
[58] Field of Search ................................. 70/182–186, 70/210, 252; 188/75, 82.2, 82.6, 82.84

[56] References Cited

U.S. PATENT DOCUMENTS

| | | | |
|---|---|---|---|
| 1,443,958 | 2/1923 | Lampert | 70/218 |
| 1,531,325 | 3/1925 | White | 70/184 |
| 3,648,813 | 3/1972 | Walters et al. | 188/82.84 X |

FOREIGN PATENT DOCUMENTS

| | | | |
|---|---|---|---|
| 555977 | 4/1957 | Belgium | 188/82.84 |
| 489107 | 12/1929 | Fed. Rep. of Germany | 188/82.84 |
| 2456644 | 5/1979 | France . | |

Primary Examiner—Robert L. Wolfe
Attorney, Agent, or Firm—Karl F. Ross; Herbert Dubno

[57] ABSTRACT

A device for blocking the rotary movement of a steering column of a motor vehicle by means of a clamping lock acting in the two directions of rotation and having two sets of axis-parallel rollers which are guided in respective coaxial cages rotatable about the steering-column axis. The rollers of each set are clamped between a cylindrical running track and associated clamping surfaces inclined relative to the running track in a first position of the cage and run freely in a second position, one cage (9) with its rollers (7a) between the running track and the clamping surfaces serving for blocking the first direction of rotation, and a second cage (10) with its rollers (7b) serving for blocking the second direction of rotation. The two cages (9,10) are rotationally adjustable in opposite directions.

13 Claims, 11 Drawing Figures

DEVICE FOR BLOCKING THE ROTARY MOVEMENT OF A STEERING COLUMN

This application is based on and claims the benefit of a prior national application No. P 32 08 375.0 filed Mar. 9, 1982 in the Federal Republic of Germany, and of a corresponding prior international application No. PCT/EP83/00039 filed Feb. 18, 1983.

The invention relates to a device for blocking the rotary movement of a steering column of a motor vehicle by means of a clamping lock acting in the two directions of rotation and having axis-parallel rollers which are guided in a coaxial cage rotatable about the steering-column axis and which in a first position are clamped between a cylindrical running track and clamping surfaces inclined relative to the running track and in a second position run freely.

Such a device is known from FR-A No. 2,456,644. In this known clamping lock, each roller blocks the two directions of rotation, and the cage guiding the rollers is dragged along by the steering column or a bush resting on the steering column from a first blocking position, in which one direction of rotation is locked, into a second blocking position in which the other direction of rotation is locked. Between the two blocking positions, there is, therefore, a play of the steering column and of the steering wheel, so that limited steering is possible. Furthermore, the known device is of relatively large construction both radially and axially.

U.S. Pat. No. 1,443,958 discloses a clamping lock for a steering column of a motor vehicle, which blocks in one direction of rotation only and which has an inner part fastened to the steering column and possessing ballshaped clamping parts and sloping surfaces, and an outer race which surrounds the inner part and on the inner rolling tracks of which the balls run. In this device, a blocking effect occurs only when the outer race running freely in the position which is not closed off is blocked by a radial bolt engaging into outer recesses in the race. Consequently, in this known device, as in the previous state of the art, a bolt engaging with a blocking action in specific rotary positions only is required for locking the steering column. So that the bolt can assume its blocking position, the race has to be rotated by means of the steering wheel until one of the recesses in the race is located opposite the bolt. This results in a complicated mode of operation which makes handling difficult. In the case of the hitherto conventional bolt of the previous state of the art, which engages into the steering column, this complicated handling is improved by the bolt having a play and being pressed by means of a spring against the shell of the steering column or against a bush resting on the steering column, until the recess for the bolt is reached. However, the result of this is that a play of the steering column, allowing limited steering of the vehicle, exists until the bolt has engaged.

The object of the invention is to improve a clamping lock of the type mentioned in the introduction, in such a way that, whilst being easy to handle, having a small design and a higher capacity for absorbing forces, it locks in the blocking position immediately without play.

This object is achieved, according to the invention, when a first cage with rollers is provided between the running track and clamping surfaces for blocking the first direction of rotation, when a second cage with rollers is provided for blocking the second direction of rotation, and when the two cages are adjustable in terms of rotation in opposite directions.

Such a device blocks or locks the steering column in the blocking position immediately, without requiring subsequent engagement or allowing slight steering in one or both directions of rotation. The locking position is reached immediately without having to be sought after the key has been withdrawn, so that the device is especially easy to handle and has a high degree of protection against theft. The device has a very small construction both axially and radially and because of the arrangement of cages can receive a large number of rollers, so that high forces can be withstood. As a result, it is also not necessary to arrange the rollers of the clamping lock at a great distance from the column axis. Even if it should be possible to cancel blocking in one direction of rotation because of a considerable force effect, blocking in the other direction of rotation is nevertheless maintained, so that a double safety function is performed.

Especially simple handling of the cages is ensured when a part projects especially radially on each cage, by means of which parts the cages are adjustable in terms of rotation. Furthermore, the cages can be adjustable in terms of rotation, especially via the projecting parts, by means of a part moved by a lock. As a result, it is possible to actuate the cages directly without further intermediate parts.

An especially simple and secure construction is ensured when the especially radially projecting parts can be moved by a lock via splines. At the same time, the sloping surfaces of the spline, which are actuated by the lock, can be formed by a part movable at right angles or axis-parallel to the lock cylinder axis. Alternatively, it is proposed that the projecting parts be movable by means of cams of a lock.

The device has especially small dimensions in an axial direction when the two approximately cylindrical coaxial cages of the same diameter have sectors which engage alternately in one another in such a way that the rollers of the two cages are located at approximately the same height in relation to the steering column and there are between the sectors free spaces which allow the rotational adjustability of the cages.

A very simple construction with small radial dimensions is obtained when the cages are arranged above one another in an axial direction on the steering column. At the same time, the parts projecting on the cages can be provided on regions of the cages adjacent to one another, so that the two projecting parts to be actuated are located close to one another and can therefore be reached easily by a lock or further actuating parts. In this case, all the elements are completely identical for the two blocking directions, but are simply arranged in an inverted manner.

The device according to the invention can have a design similar to that of an inner overrunning clutch, and in this case the cylindrical running track or tracks is or are formed by the shell surface of the steering column or a bush resting on the steering column, and the sloping clamping surfaces are formed by recesses in a fixed surrounding part. This makes it possible to achieve especially small dimensions in a radial direction.

Furthermore, the device can have a design similar to that of an outer overrunning clutch, and in this case a pot-shaped part is arranged fixed against coaxial rotation on the steering column, the inner face of the cylindrical shell of the pot-shaped part forms the cylindrical running track, and the sloping clamping surfaces are formed by an annular part which is arranged coaxially within the shell. As a result, the device can absorb especially high torsional forces when in a blocking state.

Exemplary embodiments of the invention are illustrated in the drawings and described in more detail below. In the drawings.

Figure 1:
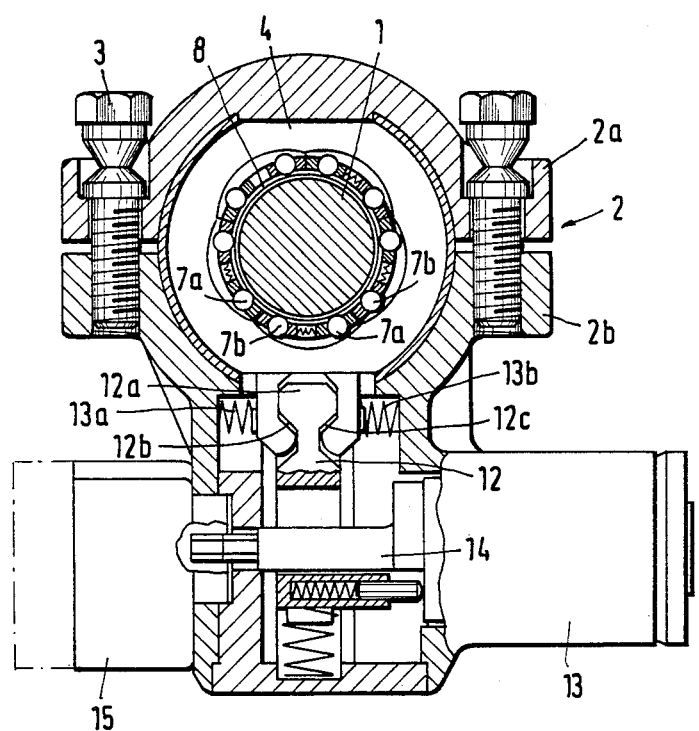
FIG. 1 shows a section through the device transversely to the column axis with a cylinder lock fastened to it.

Referring now to the drawing in greater detail, in the first embodiment of the present invention a double-shell cylindrical housing 2 is fastened round a steering column 1 or steering spindle of a motor vehicle coaxially in relation to the steering-column axis. The two semi-cylindrical shell halves 2a and 2b of the housing 2 are fastened to one another by means of shear bolts 3. Mounted fixed against rotation coaxially within the housing 2 is a cylindrical bush 4 which has in its inner wall recesses 5 having clamping surfaces 6, which are inclined relative to the running track, straight or curved for cylindrical rollers 7a and 7b. The rollers 7a and 7b run on an inner cylindrical running track 8 which is formed by the outer surface of the steering column 1. Alternatively, a bush, the outer shell of which forms the running track 8, can also rest coaxially on the steering column 1.

Figure 2:
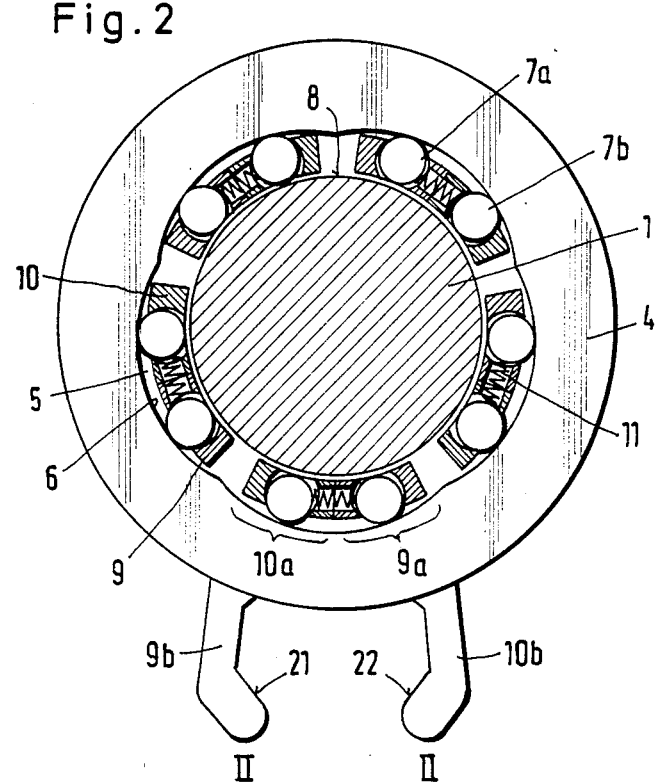
FIG. 2 shows the clamping lock as a cut-out from FIG. 1 on an enlarged scale in a non-blocking position.
Figure 3:
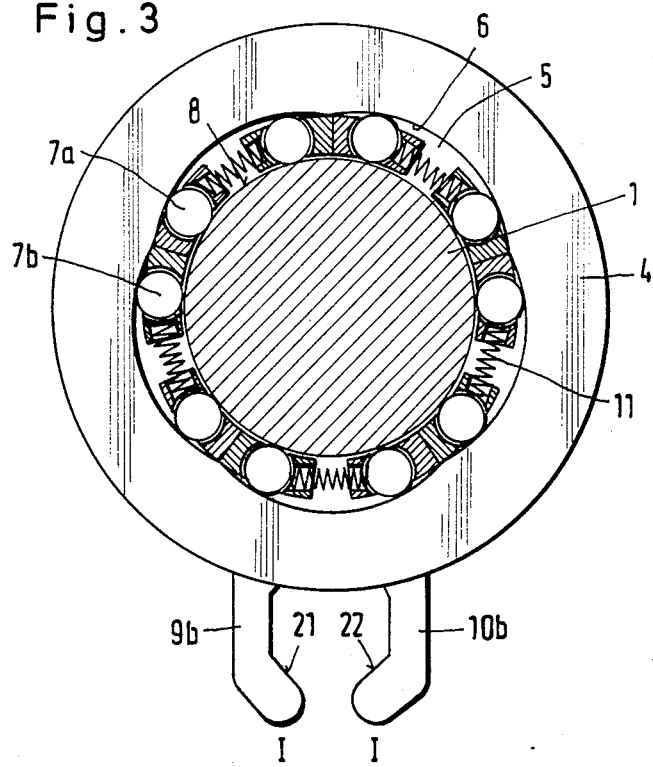
FIG. 3 shows the lock according to FIG. 2 in a blocking position.
Figure 4:
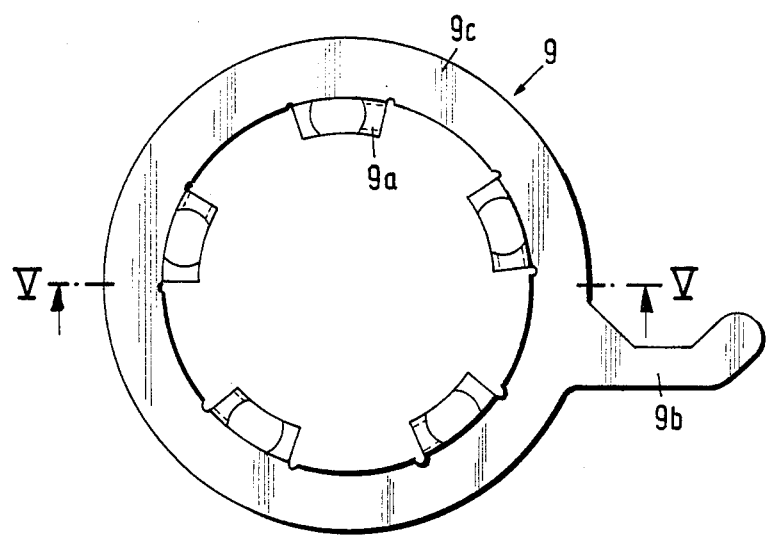
FIG. 4 shows a plan view of the first cage when not installed.

FIGS. 1 and 3 show the clamping or locked first position of the rollers, whilst FIG. 2 shows the free second position. In the first position I, the rollers 7a and 7b are clamped between the surface 6 and the track 8, so that the steering column 1 is fixed against rotation relative to the bush 4. In the second position II, the steering column 1 is freely rotatable.

One half of the coaxial rollers, specifically the rollers 7a, are mounted rotatably in a first cage 9, and the second half of the rollers, specifically the rollers 7b, are mounted rotatably in a second cage 10. Whereas in FIG. 10 the two cages are arranged axially above one another, in the exemplary embodiments according to FIGS. 1 to 9, the two cages penetrate one another in a comb-like manner by means of sectors 9a and 10a respectively. As shown in FIGS. 4 to 7, the sectors are each fastened to a ring 9c and 10c respectively axis-parallel to the steering-column axis, each sector receiving a roller 7a or 7b and the sectors of the two cages alternating with one another, so that a sector of one cage is always located between two sectors of another cage. It is important, here, that the finger-like sectors each have the form of a cut-out of a cylinder wall or sleeve wall and that there is sufficient free space between the sectors to allow rotational adjustment of the two bushes from the clamping position I to the free position II and vice versa. For every two rollers 7a, 7b of sectors 9a, 10a belonging to two different cages 9, 10 there is a recess 5 in the bush 4 fixed against rotation. The rollers 7a provided in the first cage 9 lock the steering column 1 in a first direction of rotation, and the steering column 1 can then no longer rotate in an anti-clockwise direction in the drawings, and the cage 10 locks the steering column by means of its rollers 7b in the opposite direction of rotation, namely in a clockwise direction in the drawings.

Figure 5:
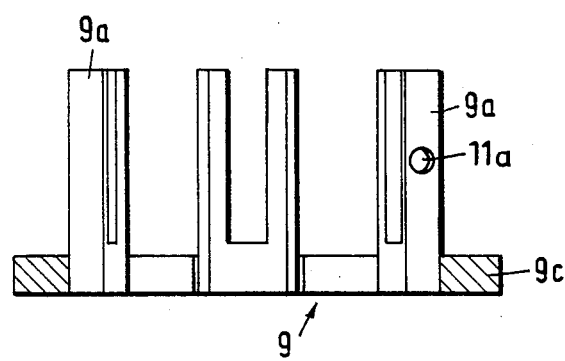
FIG. 5 shows a section along V—V in FIG. 4.
Figure 6:
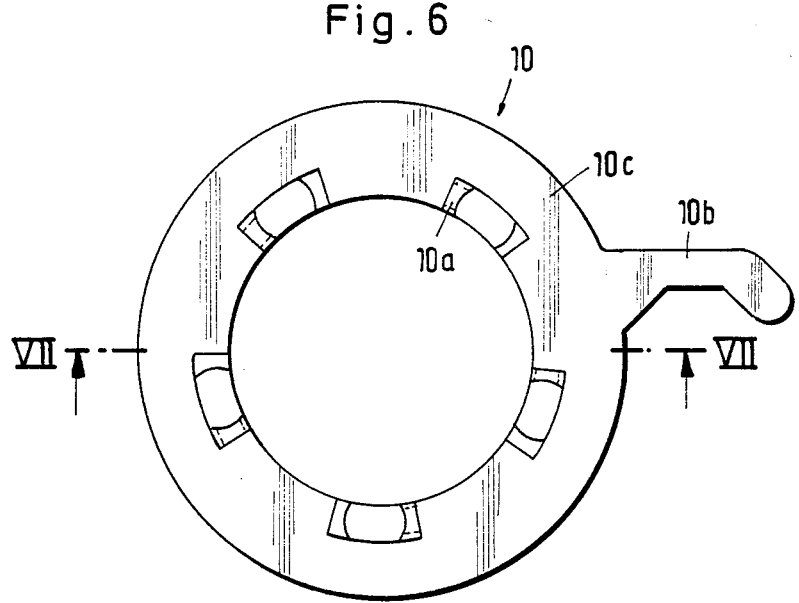
FIG. 6 shows a plan view of the second cage when not installed.
Figure 7:
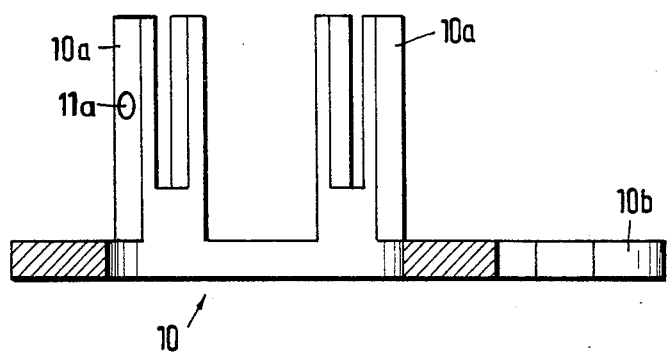
FIG. 7 shows a section along VII—VII in FIG. 6.

Since a high outlay is required to mount the rollers in the cages in such an exact manner that during a movement of the cages into the clamping position all the rollers are clamped simultaneously and with the same intensity, the rollers are mounted in the cages or cage sectors with sufficient play for them to be able to be displaced individually in an axis-parallel manner in the direction of the sector movement. This axis-parallel and individual displacement is made possible or assisted by the pressure of springs 11 which are mounted in the sectors. As a result, the forces are distributed uniformly over all the rollers, and consequently there is a uniform distribution of forces over the inner and outer rings. For this purpose, as shown in FIGS. 5 and 7, each sector has a bore 11a, the bores being arranged so that one spring is located in every two sectors of different cages, with the result that a helical compression spring 11 stresses a roller 7a and a roller 7b in the clamping direction. Instead of a single spring tangential to the running rack 8, two springs can also be arranged on a pair of rollers 7a, 7b in the vicinity of the two ends of the rollers.

Formed on each cage ring 9c and 10c is an approximately radial actuating lever 9b and 10b respectively, these projecting so far outwards that they extend beyond the bush 4 so that they can be actuated from outside. In the exemplary embodiment according to FIG. 1, between the actuating parts 9b and 10b arranged near to one another is located the head of a movable bolt-shaped part 12 which is actuated by a cylinder lock 13. The head 12a is connected to the remaining region of the part 12 via a contracted portion, the head forming in the region of the contracted portion sloping surfaces 12b and 12c which interact with corresponding sloping surfaces 21 and 22 on the inner faces of the parts 9b and 10b, so that these sloping surfaces form a spline when the bolt-shaped part 12, which is arranged radially to the steering column 1, is moved axially so as to move the actuating parts 9b and 10b and consequently the cages 9 and 10 apart from one another out of the first position into the second position counter to the pressures of the springs 11. At the same time, there can also be provided on the outer faces of the actuating parts 9b and 10b further springs 13a and 13b (FIG. 1), the pressure of which has to be overcome in addition. These springs are necessary especially when the springs 11 are lacking.

The bolt-shaped part 12 is actuated as a result of the rotation of a roller 14 of the cylinder lock 13, and the gear between 12 and 14 can be a rack gear or an eccentric gear. The roller 14 fastened to the cylinder core of the lock 13 also drives a switch 15 by means of its free end.

Figure 8:
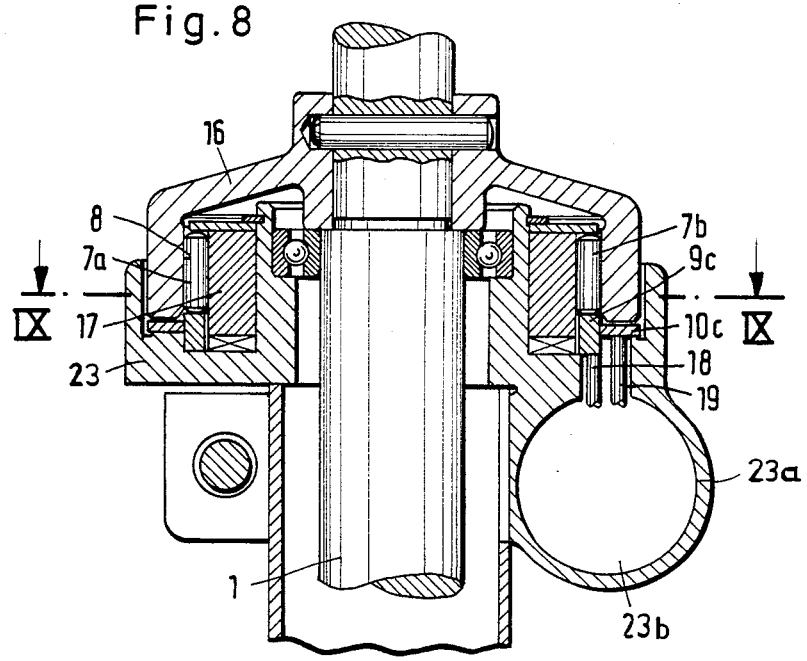
FIG. 8 shows an axial section through a second exemplary embodiment.
Figure 9:
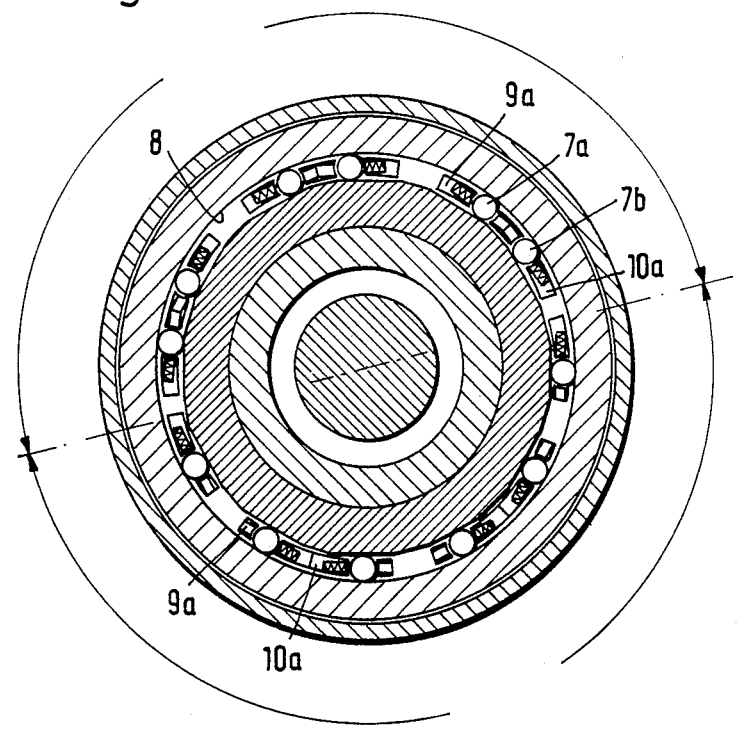
FIG. 9 shows a section along IX—IX in FIG. 8, in the locking position in the top half and in the free position in the bottom half.

Whereas in the exemplary embodiment according to FIGS. 1 to 7 the clamping lock has a design similar to that of an inner overrunning clutch, the exemplary embodiment according to FIGS. 8 and 9 differs from the first essentially only in that the clamping lock has a design like that of an outer overrunning clutch. A pot-shaped part 16 engaging over the two cages is arranged fixed against rotation on the steering column 1, the inner shell of the part 16 forming the running track 8 for the rollers 7a, 7b. The recesses 5 forming the clamping surfaces 6 are provided on the outer face of an inner ring 17 which is arranged fixed against rotation in the housing 23 which also carries the cylinder lock. A recess 23b in the housing part 23a is provided for the cylinder lock (not shown), and there project from the cylinder lock actuating parts 18, 19 which correspond to the actuating parts 9b and 10b, but which are not arranged radially, but axis-parallel to the steering column 1. The actuating part 18 is connected to the first cage or to the ring 9c of the first cage, and the actuating part 19 is connected to the ring 10c of the second cage 10, to ensure rotational adjustment of the cages. The sectors 9a, 10a of the two cages are again nested in one another in a comb-like manner. The cages or cage parts of this design have a considerably larger diameter than in the first exemplary embodiment, since the cages are not located directly on the shell of the steering column 1.

Figure 10:
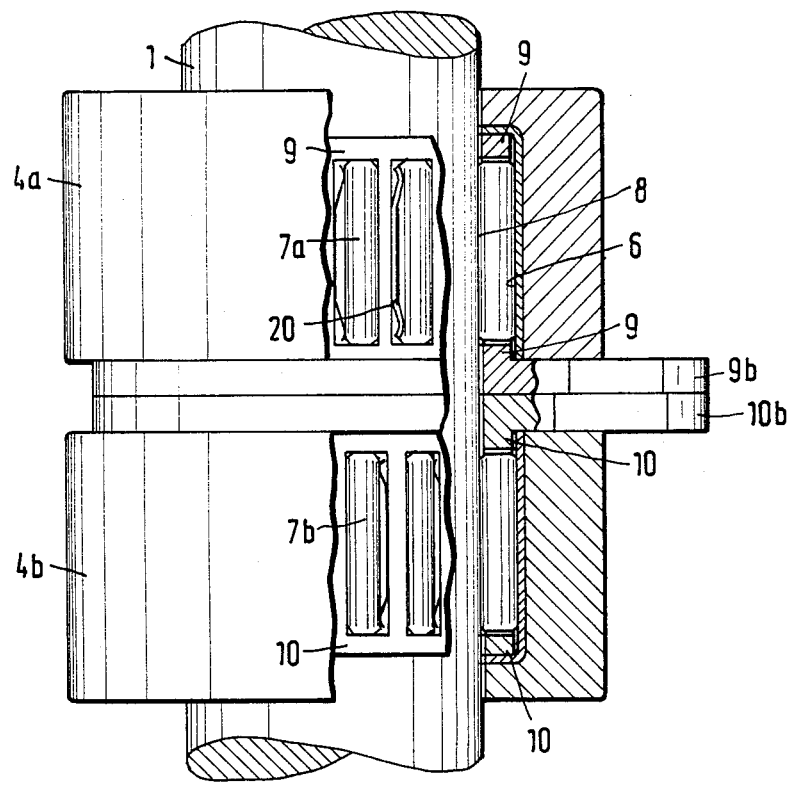
FIG. 10 shows, as a side view and partially in section, a third exemplary embodiment with two cages arranged above one another.
Figure 11:
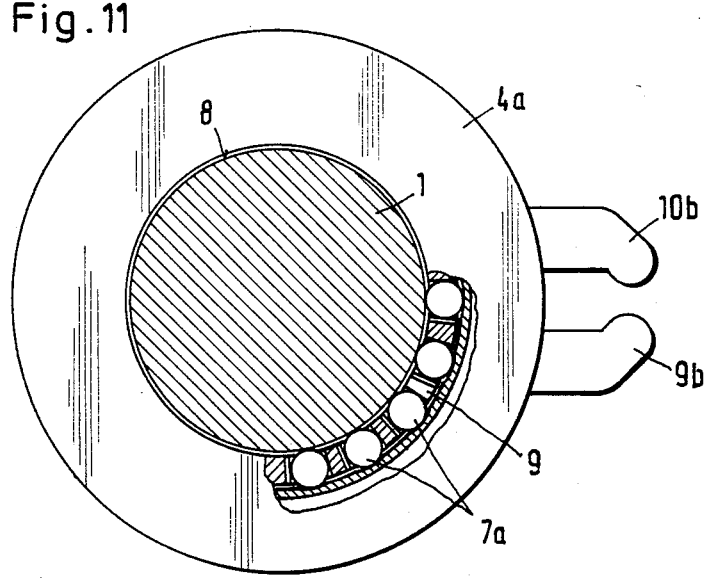
FIG. 11 shows, partially cut away, a plan view of the third exemplary embodiment.

In the two exemplary embodiments, instead of by means of a spline the lock can adjust the cages in terms of rotation by means of a cam gear, a linkage or other conventional means. Furthermore, instead of helical compression springs, other spring means, especially leaf springs 20, such as are shown in FIG. 10, can also be provided. The springs illustrated in FIG. 9 differ from those according to the first exemplary embodiment in that a helical compression spring is provided for each roller. In the third exemplary embodiment according to FIGS. 10 and 11, two cages 9 and 10 are arranged coaxially above one another, so that sectors engaging in one another in a comb-like manner are not required, as in the first two exemplary embodiments. In this exemplary embodiment, the mode of operation is the same as in the two previously mentioned, since, once again, one cage blocks one direction of rotation and the second cage blocks the opposite direction of rotation. In this exemplary embodiment, the actuating parts 9b and 10b fastened to the cages are arranged on the end faces of the cages resting against one another, so that these actuating parts are located close to one another, especially against one another, and no additional linkages are required to actuate them by means of the cylinder lock. The cylindrical bush shown in FIG. 10, which corresponds to the bush 4 of FIG. 1, is here divided in two transversely to the axis, and the rings of the two cages and consequently the actuating parts are located and guided between the end faces of the bush halves 4a, 4b. The elements arranged inverted over one another can have a completely identical design.

We claim:

1. A device for blocking the rotary movement of a steering column of a motor vehicle in the two directions of rotation of the steering column, comprising:
   (a) first and second cages coaxial with the steering column and rotatably shiftable in opposite senses about the axis of the steering column, said cages having respective sets of first and second roller-supporting members,
   (b) a bush concentric with said cages and the steering column and fixed to the latter, said bush on the one hand and the steering column on the other hand having mutually confronting circumferential surfaces spaced from one another and constituting the opposed boundaries of an annular race, and
   (c) first and second sets of rollers of identical diameters rotatably carried by the respective sets of said roller-supporting members of said first and second cages and arranged in said annular race with the axes of said rollers parallel to each other and to the steering column axis,
   (d) one of said confronting surfaces being cylindrical and defining a smooth running track for said rollers, and the other of said confronting surfaces having respective circumferentially spaced first portions the radial spacing of which from said one surface is greater than the roller diameter, and said other surface further having, at the opposite end regions of each of said first portions thereof, respective second and third portions oppositely inclined toward said one surface to a radial spacing therefrom which is less than the roller diameter, said second and third portions of said outer surface thereby defining respective clamping surfaces for said first and second sets of rollers,
   (e) said first and second cages, when rotationally shifted to respective first positions, disposing said roller-supporting members in sections of said race where the radial spacing between said one surface and said first portion of said other surface is greater than the roller diameter to enable said rollers to rotate freely and leave the steering column unblocked, and said first and second cages, when rotationally shifted to respective second positions, disposing said first and second sets of roller-supporting members in respective sections of said race where the radial spacing between said one surface and each of said second and third portions of said outer surface is less than the roller diameter to cause said rollers to be frictionally clamped by said second and third portions of said other surface against said one surface and immobilized to block the steering column.

2. A device as claimed in claim 1, further comprising first and second actuating parts connected with respective portions of said first and second cages, said actuating parts being operable to effect the rotational shifting of said cages.

3. A device as claimed in claim 2, further comprising a lock having associated therewith means for operating said actuating parts.

4. A device as claimed in claim 3, wherein said first and second actuating parts are projections extending generally radially from said first and second cages, respectively, and said means associated with said lock comprises a movable spline engageable with said said projections.

5. A device as claimed in claim 4, wherein said projections are located in proximity to each other and have at respective terminal regions thereof mutually confronting, oppositely sloping and outwardly converging first and second contact surface portions, and said spline includes a portion which is located between said projections and has correspondingly sloping third and fourth contact surface portions engageable with said first and second contact surface portions, movement of said spline portion by said lock relative to said projections effecting the rotational shifting of said cages depending on the interengagement and relative direction of movement between said contact surfaces.

6. A device as claimed in claim 5, wherein said lock is a cylinder lock, and said spline is arranged for movement in a direction parallel to the axis of said cylinder lock.

7. A device as claimed in claim 5, wherein said lock is a cylinder lock, and said spline is arranged for movement in a direction perpendicular to the axis of said cylinder lock.

8. A device as claimed in claim 3, wherein said means associated with said lock comprises cam means.

9. A device as claimed in claim 1, wherein said first and second sets of roller-supporting members of said first and second cages are interspersed with each other to dispose said first and second sets of rollers at approximately the same level relative to the steering column.

10. A device as claimed in claim 1, wherein said first and second cages are arranged one above the other as viewed axially of the steering column.

11. A device as claimed in claim 10, wherein said first and second actuating parts of said first and second cages are located adjacent one another.

12. A device as claimed in claim 1, wherein said one surface is an outwardly directed surface provided on the steering column, and said other surface is an inwardly directed surface provided on said bush.

13. A device as claimed in claim 1, wherein said one surface is an inwardly directed surface provided on said bush, and said other surface is an outwardly directed surface provided on the steering column.

* * * * *